United States Patent [19]
Fujinaka et al.

[11] Patent Number: 5,879,736
[45] Date of Patent: Mar. 9, 1999

[54] PROCESS OF MAKING A HARD BUTTER COMPOSITION

[75] Inventors: Masayo Fujinaka; Masahisa Ibuki; Tetsuya Uchiyama, all of Osaka-fu, Japan

[73] Assignee: Fuji Oil Company, Ltd., Osaka, Japan

[21] Appl. No.: 845,238

[22] Filed: Apr. 21, 1997

[30] Foreign Application Priority Data

Apr. 24, 1996 [JP] Japan .................................. 8-102243

[51] Int. Cl.$^6$ ...................................................... A23D 9/04
[52] U.S. Cl. ............................................ 426/607; 426/601
[58] Field of Search ...................................... 426/607, 601

[56] References Cited

U.S. PATENT DOCUMENTS

| | | | |
|---|---|---|---|
| 3,491,677 | 1/1970 | Bracco | 99/23 |
| 3,634,100 | 1/1972 | Fondu | 426/607 |
| 4,501,764 | 2/1985 | Gercama | 426/607 |
| 4,726,959 | 2/1988 | Momura et al. | 426/607 |
| 5,424,091 | 6/1995 | Cain et al. | 426/610 |
| 5,547,698 | 8/1996 | Lansbergen | 426/603 |
| 5,667,837 | 9/1997 | Broomhead | 426/601 |

FOREIGN PATENT DOCUMENTS

| | | |
|---|---|---|
| 0 081 881 | 6/1983 | European Pat. Off. . |
| 0 132 506 | 2/1985 | European Pat. Off. . |
| 61-224934 | 10/1986 | Japan . |
| 2-132191 | 5/1990 | Japan . |
| 2-249452 | 10/1990 | Japan . |
| 3-247240 | 11/1991 | Japan . |
| 2 023 636 | 1/1980 | United Kingdom . |
| WO 93/24017 | 12/1993 | WIPO . |

*Primary Examiner*—Carolyn Paden
*Attorney, Agent, or Firm*—Wenderoth, Lind & Ponack, L.L.P.

[57] ABSTRACT

A hard butter additive composition which comprises the middle melting point fraction of random interesterified palm stearin is provided. The hard butter additive composition of the present invention is useful for admixing with raw materials for hard butter which are not transisomerized fats nor lauric fats, and can prevent fat blooming and/or graining and improve mold removability of hard butter products such as chocolate or center cream without a tempering process.

2 Claims, No Drawings

PROCESS OF MAKING A HARD BUTTER COMPOSITION

The present invention relates to an additive composition suitable for inhibiting fat blooming or graining of hard butter products and enabling the products to exhibit desired contracting characteristics which facilitate removal of the product from the mold. The present invention also relates to a process of making a hard butter composition containing the additive composition.

BACKGROUND OF THE INVENTION

In general, hard butter in a broad sense including cacao butter mostly used for producing chocolate, or fats used for manufacturing margarine/shortening usually exist in several polymorphic forms. Change in crystal form will proceed in hard butter products leading to crystal growth, and causes undesirable phenomena, e.g., so called blooming of the solidified product or graining which is a grainy taste development in cream type products.

Usually, a tempering treatment, a heat treatment to transfer the crystal form of the fat components uniformly, is employed in manufacturing chocolate or margarine/shortening to avoid blooming and/or graining problems. However, since the tempering is a time and energy consuming process and requires precise temperature control, it has been desired to eliminate the tempering process from confectionery manufacturing processes.

There are some fats and oils known in the art that do not need tempering, such as trans-isomerized triglyceride compositions which are high in trans fatty acids (trans fats) and triglyceride compositions high in lauric fatty acid (lauric fats).

However, trans fats are known to develop undesirable flavor due to isomerization which spoils the taste of the resulting chocolate. The lauric fats generate an undesirable "soapy" flavor under some storage conditions. In order to avoid these problems, hard butter compositions that do not need to be tempered, and that do not contain trans fats or lauric fats are desired.

Heretofore, various studies have been made to prevent or control fat blooming of non-transisomerized or non-lauric hard butter compositions. Such studies include improving the hard butter composition through addition of ester-interchanged triglycerides which have long chain and short chain fatty acid residues (U.S. Pat. No. 3,491,677), addition of a surfactant (JP-A-2-249452 and JP-A-3-247240), and addition of an anti-blooming agent comprising $B_2O$, wherein B represents behenic acid residue and O represents oleic acid residue (JP-A-62-6635). However, those improved hard butter compositions still require tempering.

Recently, confectionery fat compositions that do not need to be tempered and do not contain trans fats or lauric fats have been proposed. For example, JP-A-61-224934 discloses a hard butter composition containing SSU triglycerides (1,2-saturated-3-unsaturated triglycerides) in the other raw materials for hard butter exhibits good anti-blooming property when molded without tempering treatment. U.S. Pat. No. 5,424,091 discloses a non-tempered fat composition which consists of defined amounts of SSU triglycerides, trisaturated triglycerides, and 1,3-saturated-2-unsaturated triglycerides.

These prior art hard butter compositions have accomplished the improved fat blooming or graining resistance through crystal stabilization by means of a defined amount of SSU and they can provide chocolate or chocolate coating having no blooming problem without tempering. However, since solidified hard butter products, such as solid chocolate, manufactured from those prior art hard butter compositions exhibit poor contraction upon cooling, they stick in the mold and generate problems of workability. Further, SSU type triglycerides are usually made by introducing unsaturated fatty acid, such as oleic acid, selectively in the 1 or 3 position of trisaturated triglyceride through an enzymatic treatment which requires complex procedures and high costs.

OBJECT OF THE PRESENT INVENTION

One object of the present invention is to provide a triglyceride type hard butter additive composition useful to provide a hard butter composition which does not require tempering and is not trans isomerized triglycerides nor lauric fats, and which can provide a hard butter product with improved fat blooming and/or graining resistance and mold removability.

Another object of the present invention is to provide a process of making the hard butter additive composition of the present invention easily.

Still another object of the present invention is to provide a process for making a hard butter composition containing the hard butter additive composition of the present invention.

These objects as well as other objects and advantages of the present invention will become apparent to a person skilled in the art from the following description.

SUMMARY OF THE INVENTION

Accordingly, the present invention provides a hard butter additive composition comprising the medium melting point fraction of random interesterified palm stearin which will be described in more detail below.

The present invention also provides a process of making the additive composition of the present invention which comprises interesterifying palm stearin randomly and fractioning the interesterified palm stearin to remove the high melting point fraction and the low melting point fraction.

The present invention also provides a process of making a hard butter composition which comprises admixing about 20–50 parts by weight of the additive composition of the present invention with 100 parts by weight of the other raw materials for hard butter. According to the present invention, the most preferable raw material for hard butter is the middle melting point fraction of palm oil.

The hard butter additive composition of the present invention is useful for admixing with the raw materials for hard butter which are not transisomerized fats nor lauric fats, and can prevent fat blooming and/or graining and improve mold removability of a hard butter product such as chocolate or center cream without tempering process.

DETAILED DESCRIPTION OF THE PRESENT INVENTION

The present inventors have contemplated preventing fat blooming and/or graining and improving the mold removability of hard butter products. As a result, it has been surprisingly found that an intermediate fraction of interesterified palm stearin can prevent fat blooming and/or graining of raw materials for hard butter which materials are non-transisomerized, non-lauric fats and are rich in POP, without tempering.

According to the present specification, the term "hard butter product" represents a product manufactured from hard butter. Examples thereof include solid chocolate, coating or covering chocolate, center cream and the like.

According to the present specification, the terms "non-transisomerized fats", "non-lauric fats", "not transisomerized fats" and "not lauric fats" are not used to exclude materials containing any amount of transisomerized fats and/or lauric fats. For example materials containing said fats as impurities are included in the range of above terms.

According to the present specification, "U" represents an unsaturated fatty acid residue and "S" represents a saturated fatty acid residue.

The hard butter additive composition of the present invention is triglyceride type fat or oil comprising the middle melting point fraction of random interesterified palm stearin. Palm stearin is the high melting fraction of palm oil and is generally obtained as a by-product of palm olein or palm middle fraction. Palm stearin is standardized in Japanese Agricultural Standard (JAS) and consisting from 0.2% of C12, 1.3% of C14, 59.8% of C16, 3.6% of C18, 27.7% of C18:1 and 6.4% of C18:2. According to the present invention, the hard butter additive composition of the present invention has melting point of 40°–50° C., preferably, 42°–46° C.

The present invention also provides a process of making the additive composition of the present invention. According to the present process, palm stearin is subjected to a random interesterification process. Random interesterification can be carried out by any method known in the art, such as using an alkaline metal catalyst for example sodium methylate. Then, the resulting random interesterified palm stearin is subjected to fractionation to obtain the middle melting point fraction. Fractionation can be carried out by any known method such as the dry fractionation method, fractionation using aqueous solutions of surfactant or fractionation using organic solvents. Fractionation using organic solvents such as hexane and acetone is preferable. Particularly, the high melting point fraction of the interesterified palm stearin is separated first with hexane and then the low melting point fraction is removed with acetone. Then the resulting intermediate fraction, i.e. middle melting point fraction having melting point of 40°–50° C. can be used as the additive composition of the present invention.

According to the present invention, the middle melting point fraction mainly consists of S2U, i.e. SSU and SUS, type triglycerides. In order to obtain said fraction in an amount as great as possible, the iodine value of the starting palm stearin is preferably about 34–36.

The present invention also provides a process of making hard butter compositions containing the additive composition of the present invention. According to the process, from 20 to 50 parts by weight, preferably from 25 to 35 parts by weight of the hard butter additive composition are admixed with 100 parts by weight of the other raw materials for hard butter. The other raw materials for hard butter may be triglyceride fat materials which are rich in 1,3-saturated-2-unsaturated triglyceride, especially 1,3-parmitoyl-2-oleoil gricelyne (POP). However, too much POP in the resulting hard butter composition causes graining. The raw material for hard butter is selected to raise the POP content of the hard butter composition to 40–60 wt %, preferably to 45–50 wt %.

It is preferable to use palm mid fraction as the raw materials for hard butter according to the present invention. In addition, any known fats and fatty oils or mixture thereof can be used if they can raise the above preferable POP content when admixed with the hard butter additive composition. Examples of the raw material for hard butter include commercially available raw materials for tempering type hard butter composition, shea butter, sal fat and cacao butter.

When the amount of the hard butter additive composition per 100 parts by weight of the raw material is less than 20 parts by weight, blooming and/or graining resistance of the resulting hard butter composition is scarcely expected. When the amount of the additive composition is more than 50 parts by weight, the melting in mouth properties will be deteriorated due to the trisaturated triglyceride components in the additive composition.

In cases where the hard butter is used for manufacturing of solidified product, such as solid chocolate, the amount of the additive composition or the component of the other raw material for hard butter is selected to adjust the SSU content in the hard butter to less than about 25 wt %. When the hard butter contains more than about 25 wt % of SSU, the hard butter product manufactured from the hard butter will stick in the mold upon being removed.

Hard butter products manufactured from the hard butter of the present invention do not require tempering treatment, exhibit excellent graining and blooming resistance and suitable contracting properties. The hard butter composition of the present invention can be used for the manufacturing of solid type confectionery products such as chocolate, cream type products such as center cream or margarine/shortening.

The following Examples further illustrate the present invention in detail but are not construed to limit the scope of the invention. All "parts" and "%" are by weight unless otherwise stated.

EXAMPLE 1

Palm stearin having an iodide value of 35 was subjected to random interesterification in the presence of sodium methylate as a catalyst at 80° C., for 1 hour. From the interesterified palm stearin, the high melting point fraction was separated and removed through organic solvent fractionation with hexane. The remainder was further fractionated to remove the low melting point fraction with acetone. The middle melting point fraction, i.e. the fraction having melting point of 44.0° C. was obtained in a yield of 47.0% and was used as hard butter additive composition (additive composition A) below. The triglyceride composition of the additive composition A was 25.7% of SUS, 39.6% of SSU and 12.6% of SSS and the fatty acid composition was 1.3% of C14, 65.4% of C16, 5.5% of C18, 23.0% of C18:1, 4.3% of C18:2.

A hard butter composition was prepared by admixing 100 parts of the middle melting point fraction of palm oil (I.V. 45) with 35 parts of the additive composition A and kneading the mixture at 60° C., 10 minutes. The triglyceride composition of the hard butter composition ("hard butter A") was 48.6% of SUS, 21.0% of SSU and 4.1% of SSS and the fatty acid composition was 1.2% of C14, 51.2% of C16, 5.7% of C18, 34.3% of C18:1, 6.7% of C18:2.

Chocolates having the formulation as shown in Table 1 were manufactured in a conventional manner without tempering using the hard butter A or MELANO STM® a non-tempering type hard butter containing trans fats (Fuji Oil Company Limited, Osaka, Japan) for the ingredient of "hard butter" in Table 1. The fatty acid composition of MELANO STM® was 1.2% of C14, 37.1% of C16, 6.0% of C18, 53.2% of C18:1 and 1.8% of C18:2, and the trans acid content was 44%.

TABLE 1

| CHOCOLATE INGREDIENTS: | |
| --- | --- |
|  | % by weight |
| cocoa powder | 9 |
| skimmed milk powder | 12 |
| powdered sugar | 45 |
| hard butter | 34 |
| Lecithin | 0.5 |
| vanillin | 0.03 |

When releasing the resulting chocolates from the mold, removability of the chocolates from the mold was estimated. The chocolate product manufactured from the hard butter A showed excellent removability from the mold but the product from the conventional non-tempering type hard butter stuck in the mold.

Then the chocolate bars removed from the mold were allowed to stand at 20° C. for fifty days to estimate time dependent fat blooming development. The results are shown in Table 2.

TABLE 2

| FAT BLOOM DEVELOPMENT | | |
| --- | --- | --- |
| day | hard butter A | MELANO STM ® |
| 0 | 5 | 5 |
| 5 | 5 | 5 |
| 10 | 5 | 5 |
| 20 | 5 | 5 |
| 30 | 5 | 5 |
| 40 | 5 | 5 |
| 50 | 5 | 5 | blooming: 5 = No bloom; 4 = slight bloom; 3 = bloom; 2 = strong bloom; 1 = intensive bloom These results suggest that the non-tempering, non-transisomerized and non-lauric fats hard butter composition of Example 1 is useful for manufacturing solidified confectionery.

EXAMPLE 2

Center cream products having the formulation as shown in Table 3 were manufactured according to a conventional manner using hard butter A or MELANO STM® for hard butter ingredients of Table 3.

TABLE 3

| Center Cream product | |
| --- | --- |
| ingredients | |
| cacao mass | 10 |
| whole wheat | 20 |
| powder sugar | 25 |
| β-lactose | 5 |
| hard butter | 40 |

TABLE 3-continued

| Center Cream product | |
| --- | --- |
| ingredients | |
| lecithin | 0.4 |
| vanillin | 0.03 |

The obtained center cream compositions were allowed to stand at 20° C. for fifty days to estimate time dependent grainy taste development and change in surface gloss. The results are shown in Table 4.

TABLE 4

|  | Hard butter A | | MELANO STM ® | |
| --- | --- | --- | --- | --- |
| days | surface gloss | graining | surface gloss | graining |
| 0 | 5 | 5 | 5 | 5 |
| 5 | 5 | 5 | 5 | 5 |
| 10 | 5 | 5 | 5 | 5 |
| 20 | 5 | 5 | 5 | 5 |
| 30 | 5 | 5 | 5 | 5 |
| 40 | 5 | 5 | 5 | 5 |
| 50 | 5 | 5 | 5 | 5 | surface gloss: 5 = excellent; 4 = good; 3 = slightly poor; 2 = poor; 1 = very poor
graining: 5 = No graining; 4 = slight graining; 3 = graining; 2 = strong graining; 1 = intensive graining

EXAMPLE 3

A hard butter composition was prepared by admixing 100 parts of palm mid fraction with 50 parts of the hard butter additive composition A and 16 parts of palm stearin and kneading the mixture at 70° C. for 10 minutes. The obtained hard butter composition ("hard butter B") has a triglyceride composition of 42.6% of SUS, 27.0% of SSU and 8.5% of SSS and fatty acids composition of 0.1% of C12, 1.2% of C14, 53.7% of C16, 5.6% of C18, 32% of C18:1, 6.0% of C18:2. Chocolate was manufactured from the hard butter B and other ingredients of the above Table 1 by conventional method without tempering process. When removing the resulting product from the mold, the product stuck in the mold. However, the chocolate product of Example 3 had a good quality as a coating or covering chocolate.

What is claimed is:

1. A process of making a hard butter composition which comprises admixing about 20–50 parts by weight of an additive composition which comprises the middle melting point fraction of random interesterified palm stearin with 100 parts by weight of the middle melting point fraction of palm oil which are not transisomerized fats nor lauric fats.

2. The process of claim 1 wherein the middle melting point fraction of palm oil is selected to adjust the 1,2-saturated-3-unsaturated content of the hard butter composition to less than 25% by weight.

* * * * *